United States Patent Office 3,004,058
Patented Oct. 10, 1961

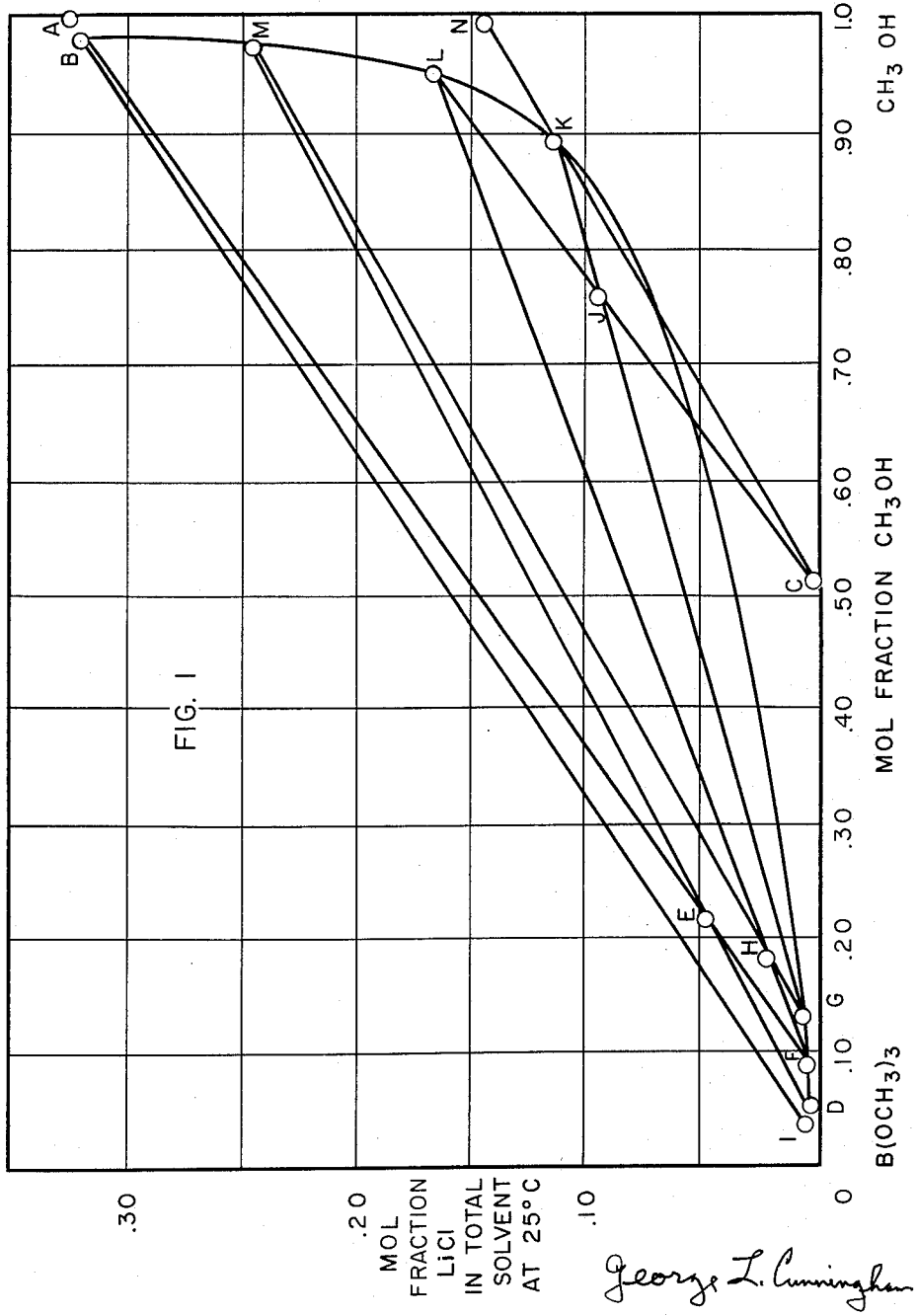

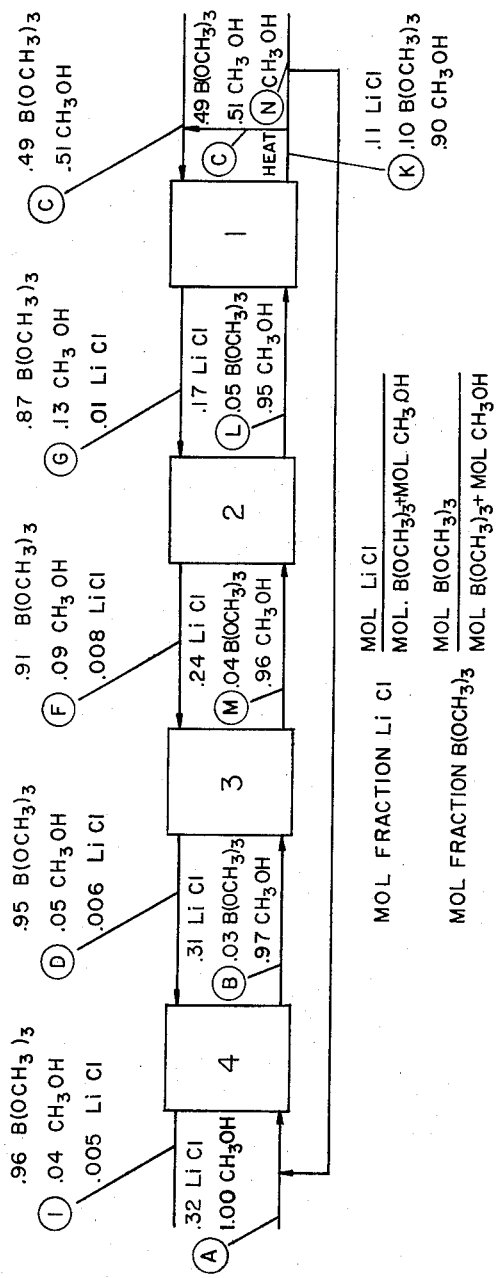
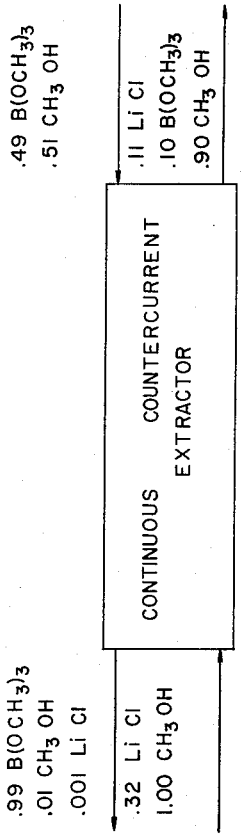

3,004,058
SEPARATION OF TRIMETHYL BORATE FROM THE TRIMETHYL BORATE-METHANOL AZEOTROPE
George L. Cunningham, San Antonio, Tex., assignor to Callery Chemical Company, Pittsburgh, Pa., a corporation of Pennsylvania
Filed Sept. 21, 1954, Ser. No. 457,790
17 Claims. (Cl. 260—462)

This invention relates to a new and improved process for preparing substantially pure trimethyl borate and more particularly to a process for separating substantially pure trimethyl borate from the trimethyl borate-methanol azeotrope.

Trimethyl borate has been prepared in the past in a variety of ways. It has been prepared by the reaction of boric oxide ($B_2O_3$) with methanol ($CH_3OH$), the ester being extracted from the reactants by washing with concentrated sulphuric acid. The azeotrope has also been prepared by reacting boric acid with methanol and distilling the azeotrope from the reaction mixture. Several investigators have separated the substantially pure trimethyl borate from the azeotrope by salting out the trimethyl borate with a salt which is very soluble in the methanol and substantially insoluble in the trimethyl borate. Some of the salts which have been used in performing such separations are lithium chloride, sodium chloride, calcium chloride, calcium nitrate, aluminum chloride, magnesium chloride and zinc chloride. Prior workers who have separated trimethyl borate from the azeotrope by use of the aforementiond salts have merely added the salts to the azeotrope in a very substantial quantity, allowed two liquid phases to develop and decanted the upper trimethyl borate layer. The methanol was then recovered by evaporation from the lower layer which consisted of a concentrated solution of the salt in methanol. This process however has proved impractical due to the difficulty of evaporating all of the methanol from the salt solution and thus resulting in the loss of a portion of the methanol and the salt.

It is therefore one object of this invention to provide a new and improved process for the separation of trimethyl borate from the trimethyl borate-methanol azeotrope. Another object of this invention is to provide an improved method of salting out trimethyl borate from the trimethyl borate-methanol azeotrope which does not require the evaporation to dryness of the methanol-salt solution. Another object of this invention is to provide a process for the separation of trimethyl borate from the trimethyl borate-methanol azeotrope by treating the azeotrope with a solution of a metal salt in methanol and decanting or otherwise withdrawing the trimethyl borate which separates as a separate layer. Another object of this invention is to provide a new and improved process for separating trimethyl borate from the trimethyl borate-methanol azeotrope by countercurrent extraction with a solution of a metal salt in methanol. Other objects of this invention will become apparent from time to time throughout the specification and claims as hereinafter related.

In the accompanying drawings, to be taken as a part of this specification, there are shown certain graphical and flow data which illustrate the novel features of this invention, in which drawings, FIG. 1 is a graph of the solubility of LiCl in various mixtures of trimethyl borate and methanol at 25° C., FIG. 2 is a flow diagram of a four stage extraction process utilizing the principles of this invention and, FIG. 3 is a flow diagram of a continuous countercurrent extraction process utilizing the principles of this invention.

This invention is based on the discovery that it is not necessary to use substantial excesses of metal salts for effecting a liquid phase separation of trimethyl borate and methanol. I have found that if a concentrated solution of an anhydrous salt in methanol, is contacted with the trimethyl borate-methanol azeotrope the system will form two liquid layers, one enriched in trimethyl borate and the other enriched in methanol and containing the salt in solution. I have also found that if the contacting of the methanol-salt solution and the trimethyl borate-methanol azeotrope is carried out in a countercurrent manner substantially pure trimethyl borate will be recovered as one of the products. The other product will be a relatively dilute solution of the salt in methanol plus a relatively small amount of trimethyl borate. This dilute solution can be fractionated to recover a small amount of trimethyl borate-methanol azeotrope and the excess methanol which has been extracted from the initial azeotropic mixture. The solution resulting from this evaporation is substantially saturated with respect to the salt being used and this saturated solution is thus in condition to be reused in the countercurrent extraction system thus making the process a closed cycle. Since it is not necessary to evaporate the methanol solution to dryness to recover the methanol separated from the azeotrope the difficulties previously mentioned are avoided.

Referring to the drawings there is shown in FIG. 1 a solubility curve for lithium chloride in various mixtures of trimethyl borate and methanol at 25° C. It should be noted that while this process is described with special emphasis on lithium chloride other salts may be used in the process as will be subsequently pointed out. In the chart shown in FIG. 1 the relative proportions along the horizontal axis are expressed in mol fractions of methanol and are determined by dividing the number of mols of methanol by the sum of the number of mols of trimethyl borate and methanol. The vertical axis of the chart shows the mol fraction of salt (lithium chloride) in the solvent at 25° C. The mol fraction of the salt is represented by the mols of lithium chloride divided by the sum of the mols of trimethyl borate and methanol in the solvent. On this chart a composition which lies above a line extending from point A to the origin of the graph would consist of two liquid phases (a methanol layer containing dissolved lithium chloride and a trimethyl borate layer) and a solid phase (undissolved lithium chloride). Compositions which lie between the aforementioned line and the solubility curve line would consist of two phases, a methanol (layer containing dissolved lithium chloride) and a trimethyl borate layer. Compositions on this chart which lie below the solubility curve would be a single liquid phase consisting of a solution of lithium chloride in a mixture of trimethyl borate and methanol.

To illustrate more completely this invention reference should be had to FIGS. 1 and 2 which illustrate this process using a four stage countercurrent extraction by a concentrated solution of lithium chloride in methanol of a trimethyl borate-methanol azeotrope. In the first stage of the extraction a tri-methyl borate-methanol azeotrope having a composition indicated by point C on the chart is mixed with a methanol solution of lithium chloride having a composition indicated by point L on the chart. The mixture then has an average composition indicated by point J on the chart and divides into two layers along the tie line G—K, having compositions G and K respectively. The liquid layer having a composition indicated by the point K is then heated and a trimethyl borate-methanol azeotrope distilled therefrom which is remixed with the azeotrope indicated at the point C. After the azeotrope is distilled from the liquid having the composition at point K the residue consists of a methanol solution of lithium chloride of a composition corresponding to point N. This solution then has the excess methanol evaporated therefrom until it is concentrated to a saturated solution having a composition corresponding to point A on the chart. The upper liquid layer having the composition of point G on the chart is then mixed with a lithium chloride methanol solution having a composition indicated by point M on the chart and giving an average composition indicated by point H. The liquid having the composition of point H immediately splits into upper and lower liquid layers having compositions corresponding to points F and L respectively on the chart. The liquid having the composition indicated by point L is the same liquid which was contacted with the azeotrope in stage 1 of this extraction. The upper liquid layer having a composition indicated by point F on the chart is contacted with a lithium chloride-methanol solution having a composition indicated by point B and producing a mixture having an average composition indicated by point E on the chart. This mixture then splits into upper and lower layers respectively having compositions indicated by points D and M on the chart. The lower liquid layer having a composition indicated by point M is the same solution which was used in the second stage of this extraction. The material having the composition indicated by point D on the chart is mixed with a concentrated solution of lithium chloride and methanol having the composition indicated by point A. This mixture thereupon splits into upper and lower layers having compositions indicated by points I and B respectively on the chart. The liquid in the lower layer having the composition indicated by point B is the same liquid which was used in the third stage of this extraction. The liquid in the upper layer having the composition indicated by point I on the chart consists of about 96 mol percent or 98+ weight percent of trimethyl borate and is removed for use as is or may be further purified by flash heating to distill off the small amount of trimethyl borate-methanol azeotrope remaining and leave pure trimethyl borate.

In FIG. 2 there is shown a flow diagram illustrating the four stage countercurrent extraction process which was just described in connection with the chart shown in FIG. 1. There are shown diagrammatically four countercurrent extractors numbered 1, 2, 3 and 4. The upper liquid layer containing a preponderance of trimethyl borate is shown as moving from right to left and the lower liquid layer consisting of a solution of lithium chloride in methanol is shown to be moving from left to right. The rimethyl borate entering extractor 1 has a composition corresponding to point C on the chart shown in FIG. 1. The lithium chloride solution or lower layer entering extractor 1 has a composition corresponding to point L in FIG. 1. The upper layer leaving extractor 1 and entering extractor 2 has a composition corresponding to point G in FIG. 1 while the lower layer leaving extractor 1 has a composition corresponding to point K in FIG. 1. The methanol layer leaving extractor 1 is shown to have an azeotrope composition distilled therefrom which corresponds to the change in composition from point K to point C in FIG. 1. This liquid is also shown as having methanol evaporated therefrom and a concentrated lithium chloride solution recycled to the methanol salt solution inlet to extractor 4, which corresponds to the concentration of the solution from point M to point A in FIG. 1 as previously described. The compositions of the upper and lower liquid layers entering and leaving each of the several extractors is given a letter which is the same as the point indicating the composition of that liquid in FIG. 1. It is thus apparent that a methanol-trimethyl borate azeotrope may be separated into its components by countercurrent extraction with a concentrated solution of lithium chloride in methanol. As has been previously described the methanol solution of lithium chloride becomes more and more dilute as it extracts methanol from the methanol-trimethyl borate mixture. However, the methanol may be completely recovered by evaporating the dilute solution until a saturated solution is obtained and not attempting to evaporate the lithium chloride to dryness. By this process the methanol extracted from the trimethyl borate-methanol azeotrope is completely recovered and only the methanol used to maintain the lithium chloride solution is recycled through the extraction stages of this process. The point of maximum dilution of the lithium chloride-methanol solution indicated by point K was arbitrarily selected. However, there is an absolute minimum point which would be the point at which a line drawn from point C touches the solubility curve tangentially, but to reach such a point would require a very large number of extractive stages and would not be a practical process. Another factor which may enter into the determination of the point of maximum dilution is the existence in the solubility chart of isopycnic tie lines. At the isopycnic point in a solubility system two liquid phases may exist having the same density and thus rendering gravity separation of those phases impossible. In a system having an isopycnic tie line compositions lying below the isopycnic line have their relative densities reversed and in such a system the trimethyl borate layer would become the bottom layer and the methanol layer the top layer thus creating a considerable problem in the operation of the continuous extraction process.

In FIG. 3 there is shown a flow diagram illustrating the application of the principles of this invention to a continuous countercurrent extraction system. In such a system a continuous countercurrent extractor such as an extraction tower would be used and would provide an almost infinite number of extraction stages. In such a system the trimethyl borate-methanol azeotrope would be fed in a stream flowing countercurrently to the concentrated solution of lithium chloride and methanol. At opposite ends of the continuous countercurrent extractor there would be removed separate streams consisting of substantially pure trimethyl borate and a dilute solution of lithium chloride in methanol respectively.

I have found in carrying out this process that it is necessary that anhydrous salts be used to prevent hydrolysis of the trimethyl borate. I have also found from experimentation with solutions of varying concentrations of various salts in anhydrous methanol that other salt solutions may be used in carrying out this process. Salts which I have found to be satisfactory for carrying out this process are lithium bromide, lithium chloride, sodium chloride, calcium chloride, calcium bromide, calcium iodide, calcium nitrate, magnesium chloride, zinc chloride, magnesium bromide, sodium iodide, barium bromide, barium perchlorate, barium iodide, cadmium bromide, cadmium iodide, lithium iodide, lithium nitrate, lithium chlorate, lithium perchlorate, lithium salicylate, magnesium acetate, magnesium iodide, magnesium nitrate, sodium bromide, sodium acetate, sodium thiocyanate, calcium thiocyanate, potassium thiocyanate, strontium bromide, zinc bromide, zinc nitrate, and tetramethoxyborates of sodium, potassium, magnesium, calcium and barium. Methanol solutions of these anyhdrous salts have been tested in this countercurrent extraction process and have been found effective in the separation of trimethyl borate from its azeotrope with methanol. These salts are used in the same manner as was described for lithium chloride. The particular salt which is to be used is dissolved in methanol in a relatively concentrated solution. This solution is run countercurrently to a stream of trimethyl borate and methanol having an initial azeotropic composition. The salt solution is discharged from one end of the extractor greatly diluted as a result of the extraction of methanol from the azeotrope while substantially pure trimethyl borate is discharged at the other end of the extrator. In using salts of this type it is important that solubility and density studies be made to determine the existence of isopycnic tie lines which may limit the degree of dilution of the salt solution which is permissible in the process. Lithium bromide has been found to be very satisfactory for use in this process because of the fact that it does not have an isopycnic tie line in the temperature range from 0°–60° C., and is sufficiently soluble in methanol to effect a good separation of trimethyl borate from the azeotrope.

While there has been described herein the best mode of practicing the invention as is required by the patent laws I desire it to be understood that within the scope of the claims appended hereto this invention may be practiced otherwise than as specifically described.

Having thus described my invention, what I desire to claim and secure by Letters Patent of the United States is:

1. A method of separating trimethyl borate from its azeotrope with methanol which consists of contacting said azeotrope with an anhydrous metal salt as a solution in methanol, said metal salt being substantially insoluble in trimethyl borate, and recovering the liquid layer enriched in trimethyl borate which separates from the solution.

2. A method according to claim 1 in which the recovered trimethyl borate layer is further contacted with the salt solution in a plurality of countercurrent extraction stages.

3. A method of separating trimethyl borate from its azeotrope with methanol which consists of passing an anhydrous metal salt as a solution in methanol in countercurrent extractive contact with a mixture of trimethyl borate and methanol, said metal salt being substantially insoluble in trimethyl borate, and recovering substantially pure trimethyl borate at one end of the extractor and dilute salt solution at the other end of the extractor.

4. A method according to claim 3 in which the dilute metal salt solution recovered at said other end of the extractor is concentrated by evaporation of methanol and the concentrated solution thus formed recirculated to said one end of said extractor.

5. A method according to claim 1 in which the anhydrous salt is an alkali metal salt.

6. A method according to claim 1 in which the anhydrous salt is an alkaline earth metal salt.

7. A method according to claim 5 in which the anhydrous salt is of the class consisting of halides, nitrates, chlorates, perchlorates, acetates, thiocyanates, tetramethoxyborates, and salicylates of alkali metals.

8. A method according to claim 6 in which the anhydrous salt is of the class consisting of halides, nitrates, chlorates, perchlorates, acetates, thiocyanates, tetramethoxyborates, and salicylates of alkaline earth metals.

9. A method according to claim 3 in which the salt is an alkali metal salt.

10. A method according to claim 3 in which the salt is an alkaline earth metal salt.

11. A method according to claim 9 in which the anhydrous salt is of the class consisting of halides, nitrates, chlorates, perchlorates, acetates, thiocyanates, tetramethoxyborates and salicylates of alkali metals.

12. A method according to claim 10 in which the anhydrous salt is of the class consisting of halides, nitrates, chlorates, perchlorates, acetates, thiocyanates, tetramethoxyborates, and salicylates of alkaline earth metals.

13. A method of separating trimethyl borate from its azeotrope with methanol which comprises subjecting a stream of said azeotrope in an extractor to continuous countercurrent extraction with an anhydrous metal salt that is present as a substantially saturated solution in methanol, said salt being substantially insoluble in trimethyl borate, recovering substantially pure trimethyl borate at one end of said extractor, recovering at the other end of said extractor a dilute solution of said metal salt and azeotrope in methanol, distilling the excess methanol and trimethyl borate-methanol azeotrope from said dilute solution to form a saturated metal salt solution, and recirculating said saturated salt solution to said one end of said extractor.

14. A method according to claim 13 in which the anhydrous salt is of the class consisting of halides, nitrates, chlorates, perchlorates, acetates, thiocyanates, tetramethoxyborates, and salicylates of alkali metals.

15. A method according to claim 13 in which the anhydrous salt is of the class consisting of halides, nitrates, chlorates, perchlorates, acetates, thiocyanates, tetramethoxyborates, and salicylates of alkaline earth metals.

16. A method according to claim 13 in which the length of extractive contact of said liquid streams is such that the concentration of said dilute salt solution is greater than the concentration of salt dissolved in methanol which has the same density as methyl borate.

17. A method according to claim 16 in which the salt is a lithium halide.

References Cited in the file of this patent

UNITED STATES PATENTS 2,167,632     Brownscombe et al. _____ Aug. 1, 1939

OTHER REFERENCES

Schlesinger et al.: J. Am. Chem. Soc. 75, pages 213–15, 1953.

Lange: Lange's Handbook of Chemistry, 5th ed. (1944), (pages 202–203 and 224–225 relied on).